Patented Sept. 21, 1926.

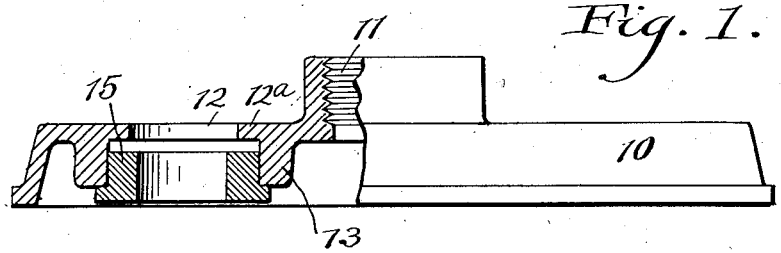
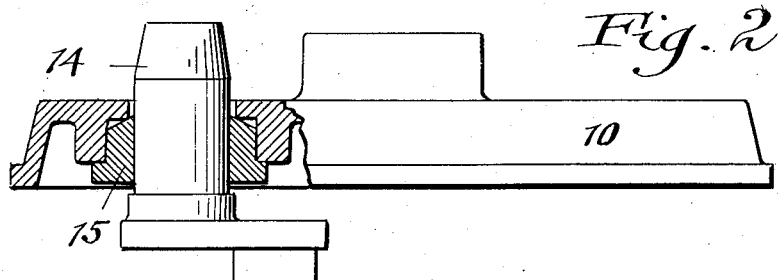
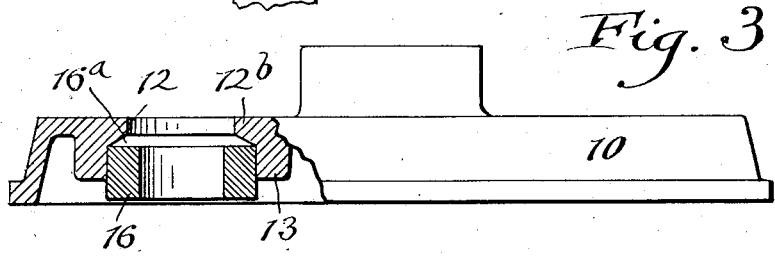
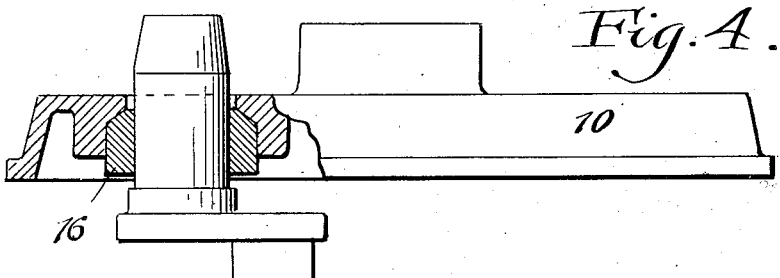

1,600,442

UNITED STATES PATENT OFFICE.

THEODORE A. WILLARD, OF CLEVELAND HEIGHTS, OHIO, ASSIGNOR TO WILLARD STORAGE BATTERY COMPANY, OF CLEVELAND, OHIO, A CORPORATION OF WEST VIRGINIA.

STORAGE-BATTERY COVER.

Application filed September 4, 1920. Serial No. 408,172.

This invention relates to storage batteries, especially to a cover with sealing sleeves on the under side thereof adapted to make a tight fit with the terminal post of the battery when the cover is fitted down into the top of the jar. The object of the invention is to provide a construction such that the covers with their sealing sleeves can be readily slipped down over the terminal posts without danger of breaking the cover, while at the same time a sufficiently tight fit is obtained between the sealing sleeves and the terminal post to prevent leakage of the electrolyte.

The invention may be briefly summarized as consisting in certain novel details of construction and combinations and arrangements of parts which will be described in the specification and set forth in the appended claims.

In the accompanying sheet of drawings wherein I have shown two slightly different forms of my invention, Fig. 1 is a side view of the cover with parts broken away, showing one form of sealing sleeve; Fig. 2 is a similar view with the cover and a sleeve slipped over a terminal post; Fig. 3 is a view similar to Fig. 1, showing a slight modification; Fig. 4 is a view similar to Fig. 2 of the form of the invention shown in Fig. 3; and Figs. 5 and 6 are detached views of the sealing sleeve shown in Figs. 1 and 3 respectively.

Referring now to the drawings, 10 represents the cover which may be, and preferably is formed of hard rubber. The cover is generally provided with a flanged opening 11 for a vent plug, and on opposite sides of the vent plug, openings 12 are provided for the terminal posts. In this instance the cover is provided on its under side around each opening with a depending flange 13, the internal diameter of which is somewhat larger than the diameter of the openings 12, so that the cover is provided with a shoulder or portion 12ª which overhangs the space within the flange 13. For the purpose of sealing the terminal posts 14 of the battery in the cover I employ elastic sealing sleeves, such as shown at 15 in Figs. 1, 2 and 5, or at 15 in Figs. 3, 4 and 6, these sleeves being preferably formed of relatively soft rubber.

In order that sealing sleeves of this type may be employed effectively, it is essential that they tightly grip or fit tightly over the terminal posts, and they should fit tightly within a space or recess on the under side of the cover, i. e. that they be tightly clamped between the post and a surrounding wall of the cover. Obviously, therefore, this makes it necessary that the sleeve be provided with an opening which normally is smaller than the terminal post. However, it has been found that when a sealing sleeve of this type is forced down over a post it is very difficult to slip the sleeve and cover over the post when the sleeve is properly seated on the under side of the cover, and that in forcing the sleeve and cover over the post there is considerable danger of breaking the cover.

I avoid these difficulties by providing an expansion space for the sleeve as it is slipped over the post, and at the same time have the proper retention between the sleeve and the cover so that it does not slide relative to the cover in an axial direction.

The results can be obtained in the desired manner by two forms of sleeve which require a slightly different shape of the sleeve receiving space in the cover. One form of the invention is illustrated in Figs. 1, 2 and 5, and with this form of the invention the sleeve 15 is provided at the bottom with a flange or shoulder 15ª. The outer diameter of the body of the sleeve is such that it will fit easily, but nevertheless closely inside the depending flange 13, the shoulder 15 then engaging the lower end of this flange. The height of the sleeve measured from the shoulder to the opposite end is somewhat less than the distance from the lower end of the flange 13 to the under side of the overhanging shoulder 12ª of the cover; that is to say, there is an expansion space 15ª provided between the upper end of the sleeve and the overhanging portion of the cover, which expansion space allows the sleeve to extend itself lengthwise of the post to take care of the expansion of the opening of the sleeve when it is forced over the post. This expansion space is of just sufficient size that when the sleeve and cover are slipped over the post, the sleeve will substantially fill the space inside the depending flange 13, as shown in Fig. 2, though the sleeve is held by the engagement of the shoulder 15ª with the bottom of the flange 13 from moving bodily in an endwise direction. At the same time there is the necessary tightness of fit between the post and the sleeve to prevent leakage, though in forcing the parts into the position shown in Fig. 2, the expanding pressure of the rubber is never sufficient to break the cover.

With the other form of the invention I employ a plain annular sleeve 16 which is cylindrical in shape, or of the same diameter from end to end. With this sleeve the shoulder of the cover, here designated 12$^b$, which overhangs the space within the depending flange 13, has its bottom surface tapered, flaring downwardly and outwardly from the terminal post opening 12 to the inner wall of the flange 13. In consequence, when the sleeve 16 is slipped within the flange 13, the outer part of the shoulder 12$^b$, i. e. the part next to the inner wall of the flange 13 forms a stop or abutment against which the outer upper end of the sleeve bears and therefore prevents bodily endwise movement of the sleeve when it and the cover are slipped over the terminal post. This forms a tapered expansion space 16$^a$ between the upper end of the sleeve 16 and the part of the cover which overhangs it, but when the sleeve and cover are forced over the post, the lateral expansion of the sleeve is taken care of by the rubber filling this expansion space so that when the sleeve and cover are slipped over the post the sleeve assumes the shape shown in Fig. 4 which is substantially the shape that the sleeve 15 assumes, as shown in Fig. 2.
The same advantages are obtained with this construction as with the construction just described, in the way of ease of assemblage, tightness of fit between the sleeve and the post, and elimination of danger of breakage.

Having described my invention, I claim:—

1. A storage battery cover having a terminal post opening and having a straight cylindrical recess on its under side beneath the terminal post opening and larger than the terminal post opening whereby a portion of the cover overhangs the recess, and a flexible sealing sleeve fitted in said recess and adapted to tightly grip a terminal post extended through said opening and to be compressed between the post and the cylindrical wall of the recess, there being a space between the top of the sleeve and the overhanging portion of the cover into which the sleeve may expand when the terminal post is extended through the sleeve.

2. A storage battery cover having a terminal post opening and a flexible sealing sleeve seated in a straight cylindrical space on the under side of the cover and adapted to tightly engage a terminal post extending through said opening and the cylindrical wall of the recess, there being between the sleeve and the cover a shoulder to limit or prevent endwise movement of the sleeve when it and the cover are slipped over a terminal post of the battery, and there being a space between the upper end of the sleeve and the cover into which space the sleeve may expand when the terminal post is extended therethrough.

In testimony whereof, I hereunto affix my signature.

THEODORE A. WILLARD.